N. B. WALES.
TRACTOR CARRIAGE FOR AUTOMOBILES.
APPLICATION FILED AUG. 16, 1918.
1,286,846.
Patented Dec. 3, 1918.
7 SHEETS—SHEET 6.
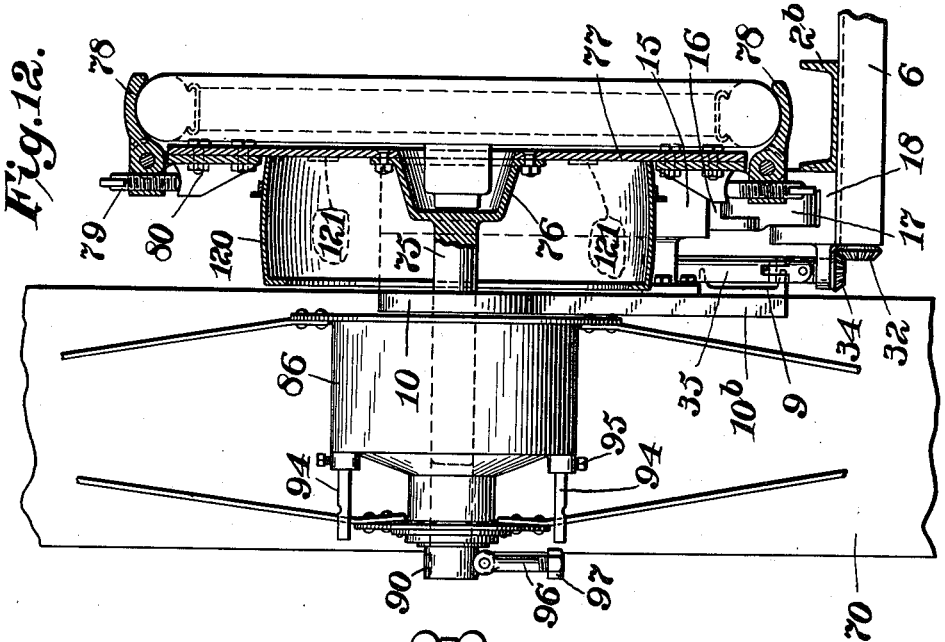
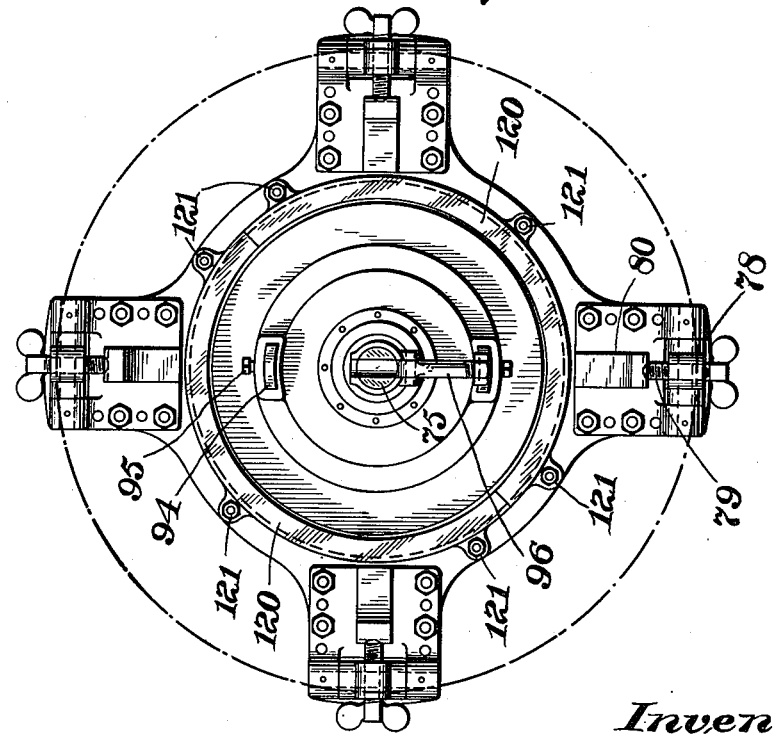
*Inventor:*
*Nathaniel B. Wales,*
*by Eugene E. Brown*
*Atty.*

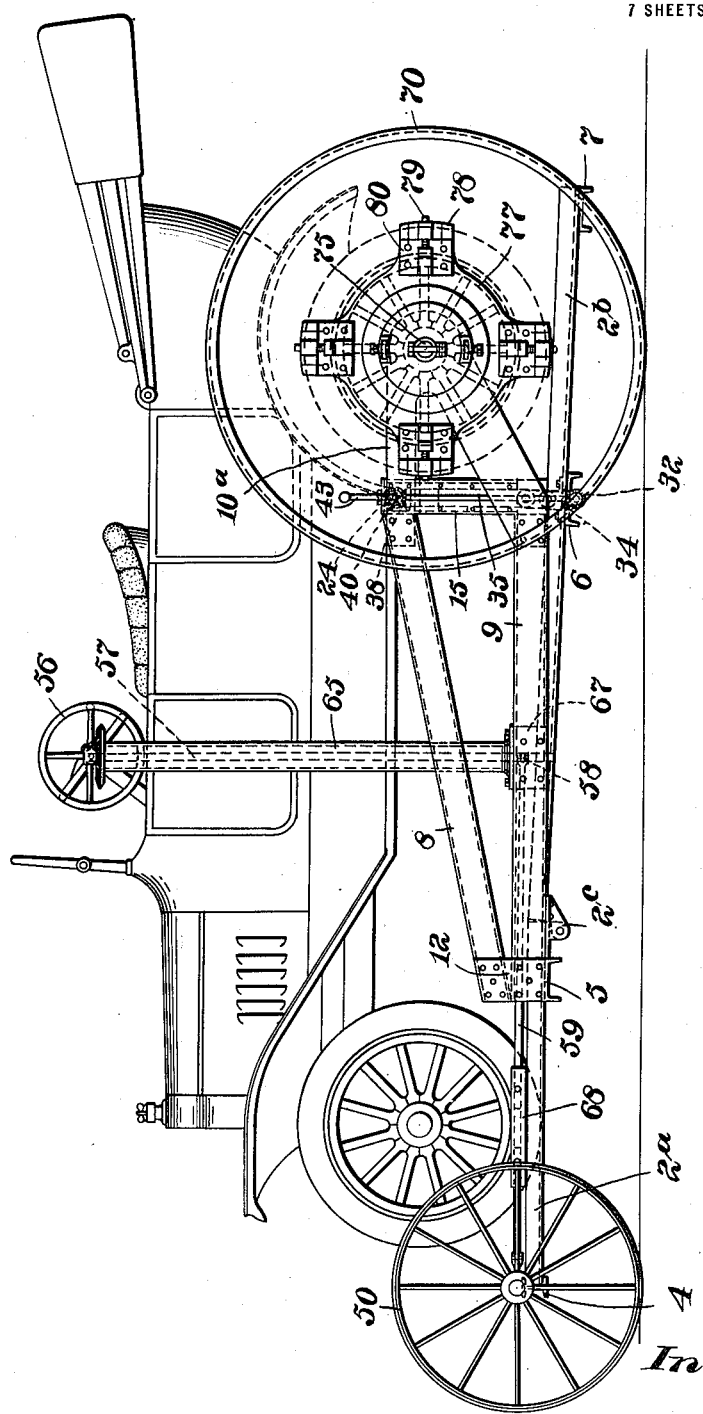

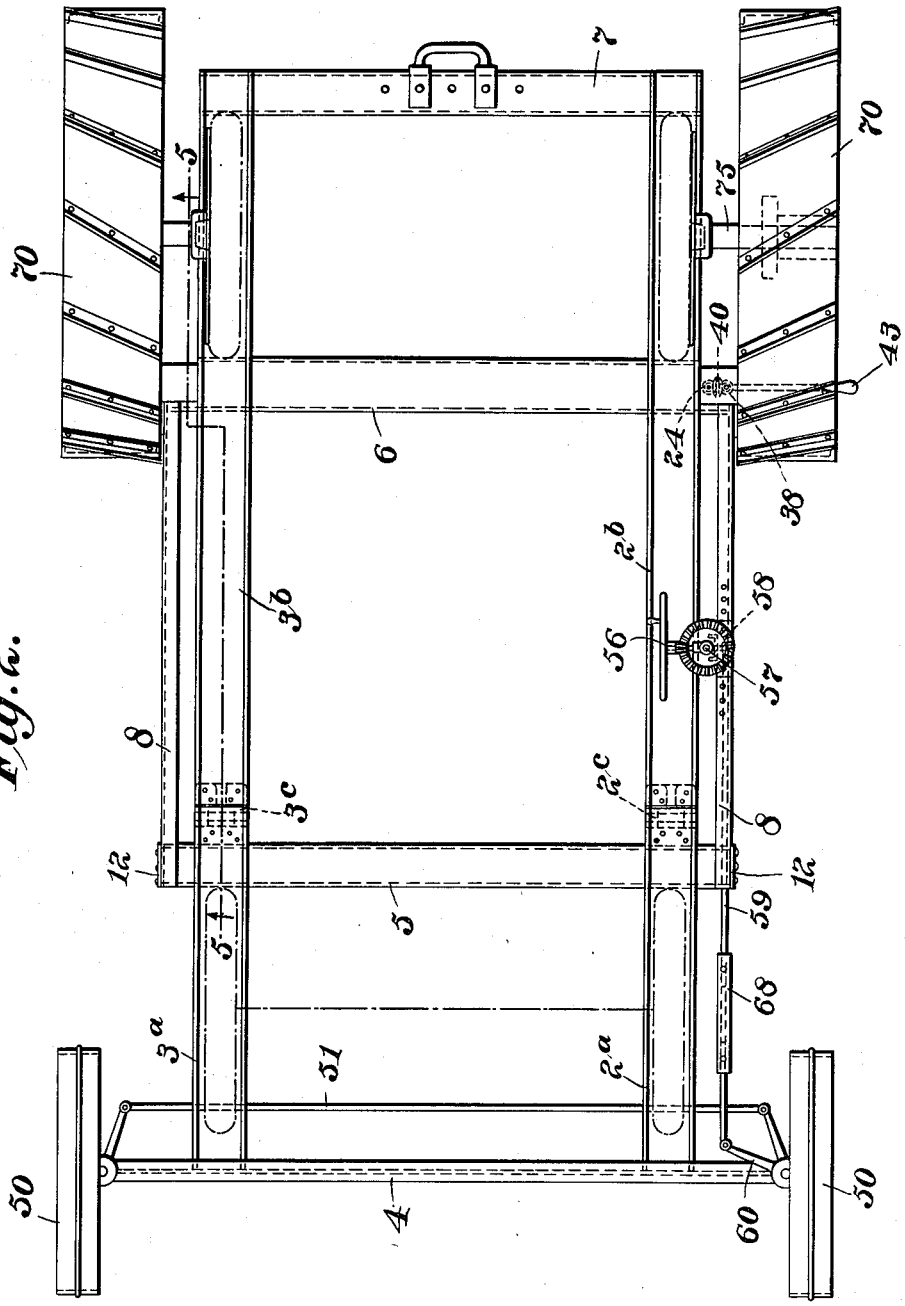

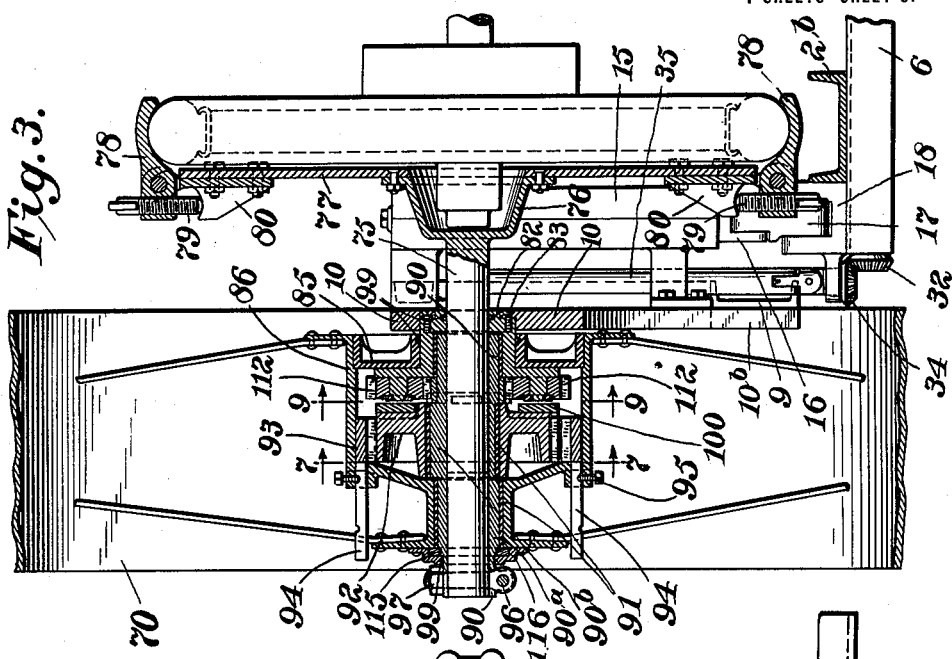

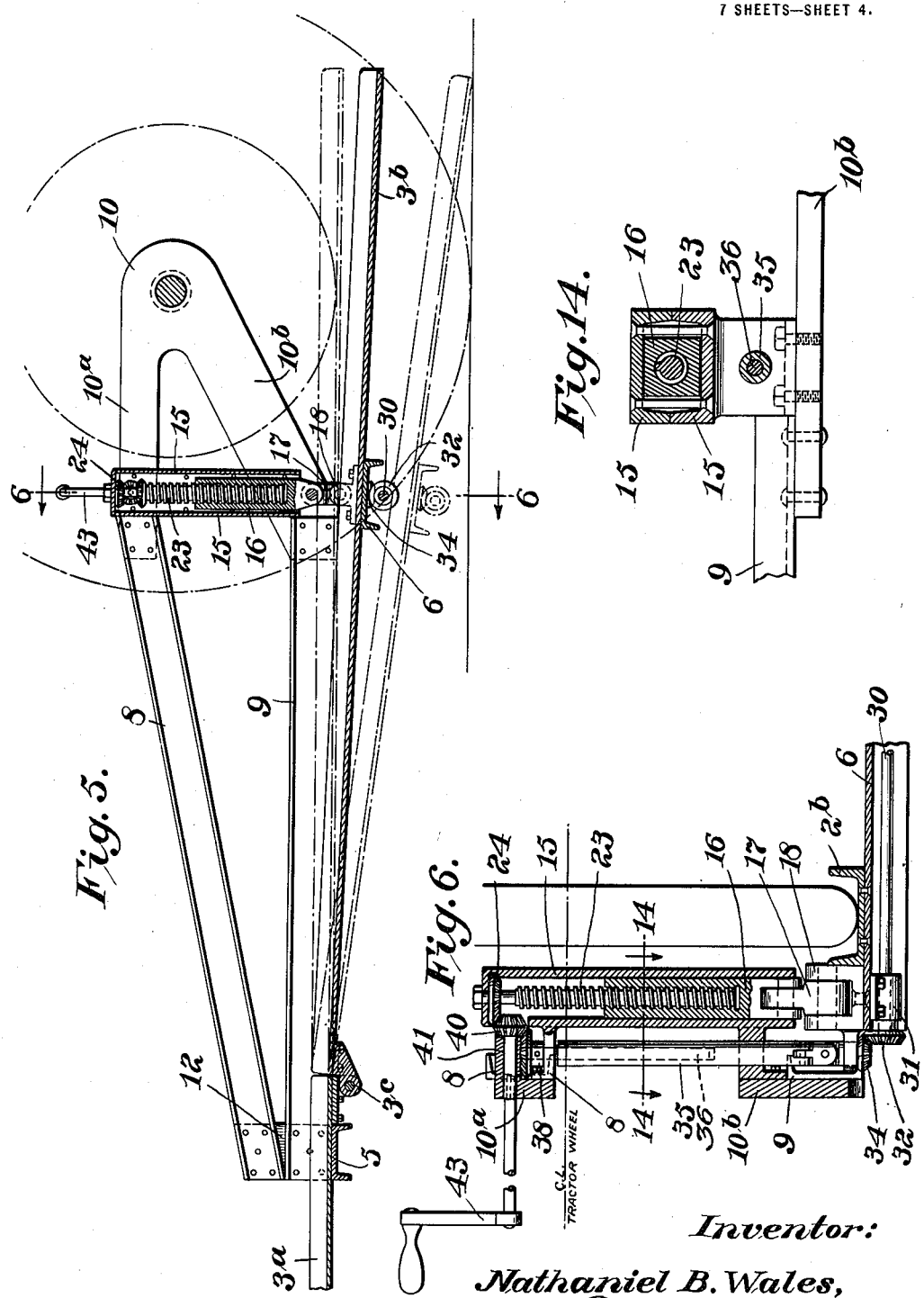

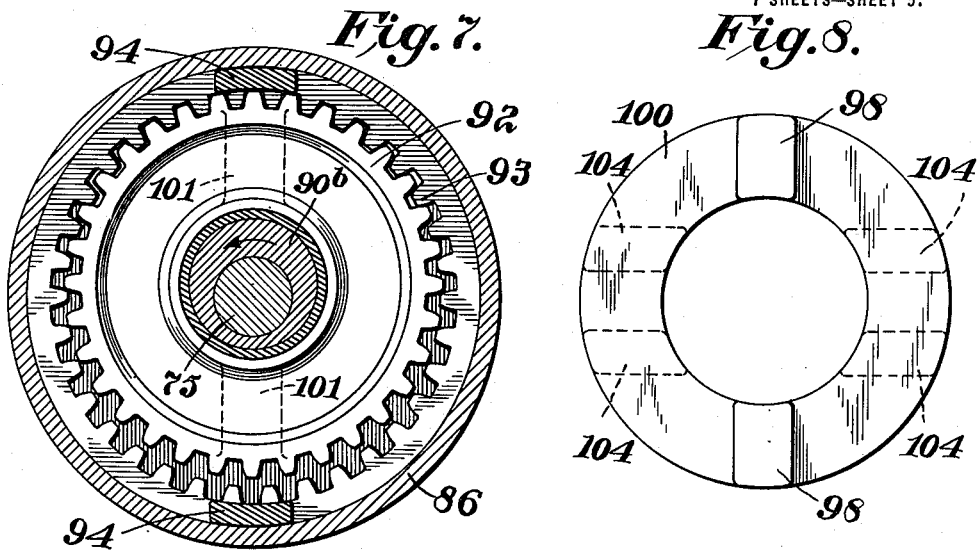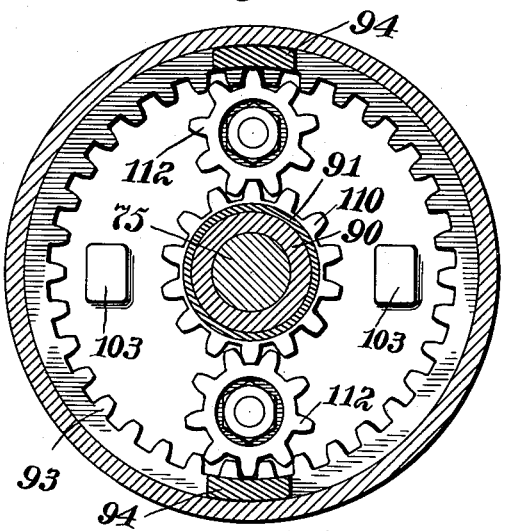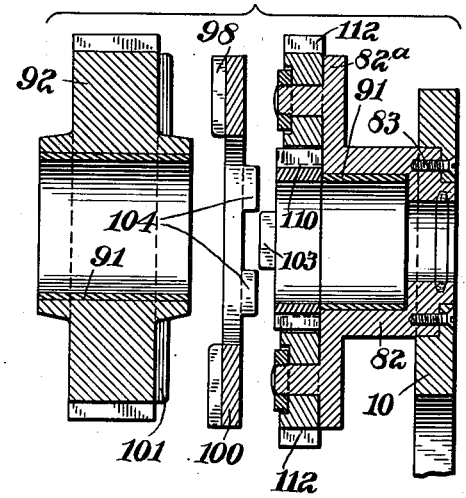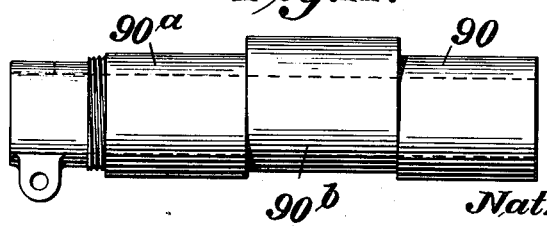

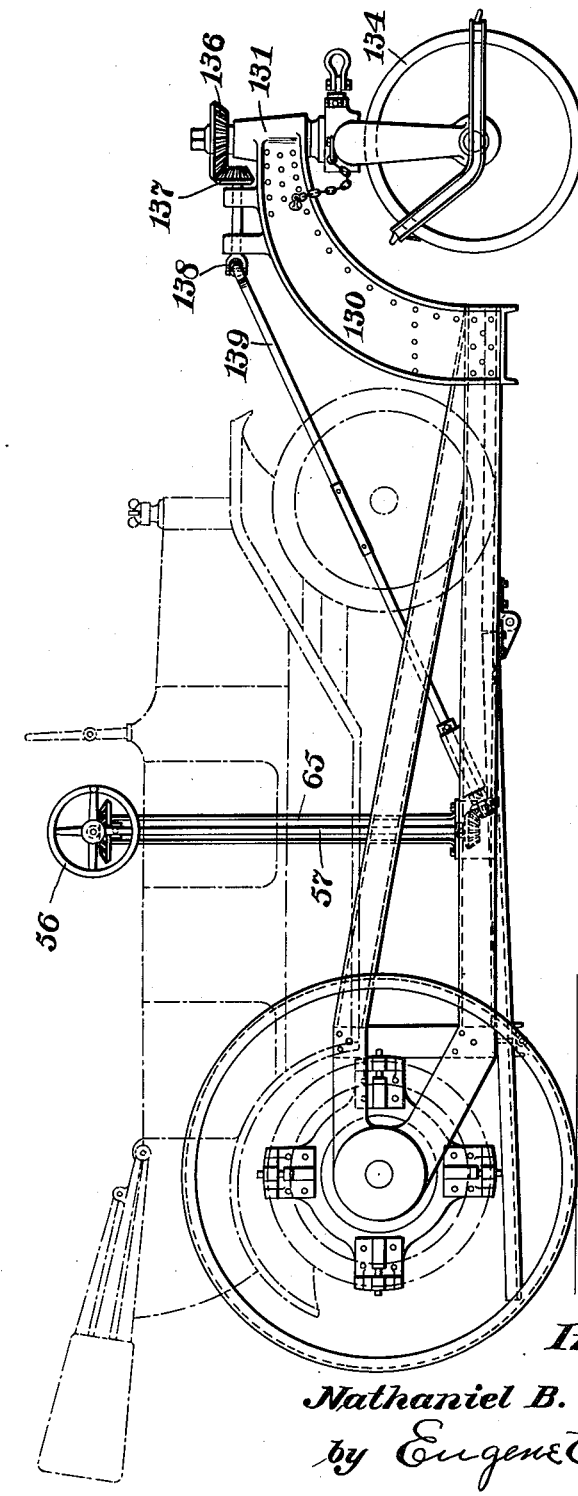

UNITED STATES PATENT OFFICE.

NATHANIEL B. WALES, OF NEW YORK, N. Y.

TRACTOR-CARRIAGE FOR AUTOMOBILES.

1,286,846. Specification of Letters Patent. Patented Dec. 3, 1918.

Application filed August 16, 1918. Serial No. 250,114.

*To all whom it may concern:*

Be it known that I, NATHANIEL B. WALES, a citizen of the United States, residing at New York, in the county of New York and State of New York, have invented certain new and useful Improvements in Tractor-Carriages for Automobiles, of which the following is a specification.

This invention relates to tractor-cars which may be used in conjunction with automobiles without alteration to form tractors.

At the present time there is an imperative need for an efficient tractor capable of supplying all of the mechanical power required in farming, not only for pulling the plows, harrows, cultivators, etc., and for operating harvesters, feed-cutters, silo-elevators, mixing machines, etc., but for hauling the loaded trucks and wagons to the market centers and shipping points. Never in the history of the world has there been such a demand for increased crops and this at a time when the man-power has been greatly reduced. Motor-driven tractors are used to a certain extent upon large farms but their large initial expense makes them practically beyond the reach of the average farmer and the fact that they are actually in use only from 35 to 45 days in the year forbids such a heavy added investment in connection with the small farm. Moreover, the operation of a tractor machine requires considerable experience if not the services of an expert mechanic.

The purpose of my invention is to provide a tractor-car upon which any automobile may be quickly mounted and having means for readily connecting the driving wheels of the automobile to the traction wheels of the car. No skill is required in making this connection and it is evident that the tractor can be operated by any man, woman or child who can operate an automobile. This is important at the present time because any farm hand and the women of the farmer's family can operate this tractor. The cost of the tractor-car is very small and as nearly all farmers now have automobiles for pleasure purposes or for use in traveling between their farms and the cities or towns and to take their children to and from school, this invention brings the tractor within the reach of practically every farmer and requires such a small investment that the increased outlay is almost negligible.

It has been proposed heretofore to provide power attachments having a platform adapted to be secured to the front axle of an automobile, utilizing the front steering wheels thereof, the platform carrying the rear wheels and having traction wheels operatively connected to the engine of the automobile. Such attachments are, however, not practicable as the wheels of an automobile are not adapted to the rough usage required in the ploughed field and the pneumatic tires are soon worn out.

It has also been proposed to provide a tractor platform upon which an automobile is mounted and to connect the engine to the traction wheels by attaching a supplemental sprocket wheel to the rear driving wheel of the automobile which may be connected by a driving chain with a sprocket on the traction wheel or connected therewith through intermediate gearing. This requires an alteration in the automobile and the attachment of a sprocket or gear usually by securing it to the spokes of the wheel. Not only is this a disfigurement, but the use of a chain and sprocket driving connection is especially objectionable on account of the sand, dust, clay and mud with which it soon becomes clogged. Aside from this the lateral strains upon the automobile axle imposed by the pull of the chain, are exceedingly detrimental.

I have devised a tractor-car upon which the automobile may be driven without change or alteration, and instantly connected to the traction wheels through the tires of the rear automobile wheels, the major weight of the automobile being transferred directly to the traction wheels, and the rear axle being in alinement with the hubs of the traction wheels thereby producing a most direct power and weight transmission.

The speed reduction mechanism is inclosed within the hub of the traction-wheel, being completely housed from dust and grit and running in a bath of oil or grease to provide a minimum of friction. The reduction gear mechanism, which is of extreme simplicity and great strength, provides a speed of about two and a half miles per hour for pulling plows or other farm implements through the field and another ratio affording a speed of about nine miles when operating on the road in hauling trucks or wagons, thereby allowing the engine to operate constantly at the average rate which would produce a normal speed of the automobile of about twenty-two miles per hour. It is evident that the automobile is not subjected to any additional strains either by reason of any changed speed conditions or by reason of any changes in the transmission of power. In fact, the strains upon the automobile will be less than usual when it is operating in conjunction with my traction-car.

For the purpose of disclosing the invention I have illustrated in the accompanying drawings one practical embodiment thereof, but it will be evident to engineers that other forms may be employed and that various changes and modifications may be made in the structural features.

Figure 1, is a side elevation of my tractor-car showing an automobile operatively connected thereto; Fig. 2 is a top plan view of the tractor-car and showing the position of the automobile wheels; Fig. 3, is an enlarged longitudinal sectional view through the hub of the tractor-car and showing an automobile wheel clamped in operative position; Fig. 4 is a front or face view of the latter; Fig. 5 is a sectional view on the line 5—5 of Fig. 2; Fig. 6 is a sectional view on the line 6—6 of Fig. 5; Fig. 7 is an enlarged sectional view on the line 7—7 of Fig. 3; Fig. 8 is a face view of the lug-plate forming a part of the "Oldham" coupling in the reduction gear mechanism; Fig. 9, is a sectional view on the line 9—9 of Fig. 3; Fig. 10 is a detail view showing the parts associated with the "Oldham" coupling separated; Fig. 11, is an enlarged side elevation of the cam sleeve of the reduction gear mechanism; Fig. 12 is a partial diagrammatic and longitudinal sectional view through a traction wheel and tire clamping mechanism showing the manner of attaching a belt pulley for transmitting power to other machines; Fig. 13 is a front or face view of the same; Fig. 14 is an enlarged cross sectional view on the line 14—14 of Fig. 6, showing the manner of connecting the casing of the lifting jack to brace the truss frame; and Fig. 15 is a side elevation of the tractor carriage arranged as a road roller.

The main frame of the tractor-car comprises side sills formed of front and rear portions 2ª, 2ᵇ and 3ª 3ᵇ respectively hinged at 2ᶜ, 3ᶜ, and connected by transverse beams 4, 5 and 6 and 7, riveted thereto, together with auxiliary side frame members consisting of diverging bars or beams 8 and 9, and a cast yoke bearing member having arms 10ª, 10ᵇ riveted to their separated ends, the meeting ends being riveted by means of yoke-plates 12, with the side beams 2ª, 3ª. All of the frame bars may be made of structural shapes and are preferably channel bars, except the front sill member 4 which constitutes the forward axle of the car and is preferably an I-beam. The channels of the side sills face upwardly and form runways for the wheels of the automobile.

When an automobile is to be run upon the platform or frame of the tractor-car, the rear portions of the side sills are lowered on their hinges until the outer ends rest upon the ground as indicated in the lower dotted lines in Fig. 5 and after the car has moved up these inclined runways the members 2ᵇ, 3ᵇ are raised into the upper dotted line position until the car is in proper position with the rear axle in alinement with the traction wheel hubs. After the tires have been clamped the frame bars are lowered slightly to clear the wheels and clamping devices. For the purpose of thus swinging the rear frame bars upon their hinges, I provide adjusting or lifting jacks which are built into the frame.

The housing or casing of the jack may be formed of a pair of channel bars 15 bolted together and bolted at their ends to the stationary side frame members 8, 9, 10, forming a brace therebetween and binding these auxiliary frame members into a rigid truss structure. Slidingly mounted within the recess formed by the channel bars is a block or cross-head 16, pivotally connected by a link 17 with ears 18 riveted to the transverse frame bar 6, which is riveted to the hinged side member 2ᵇ, 3ᵇ and forms a rigid brace therebetween. The block 16 is provided with a threaded bore to receive the screw 23, to which is splined the bevel gear 24. The opposite side of the frame is provided with the same construction and in order that the screws 23 may be operated simultaneously a shaft 30 mounted in the bearings 31, extends across the frame within the channel of the bar 6, and carries bevel gears 32, which mesh with gears 34, secured to the sleeve 35, the latter telescoping slidably with the rod 36, which is splined therein, and carries the bevel gear 38 at its upper end. A double bevel gear 40, mounted in a bearing 41, meshes with gears 24 and 38 and is provided with a socket to receive the squared end of the crank 43, by which the jack screw 23 may be operated to lower or raise the blocks 16, of the two jacks when it is desired to lower or raise the pivoted frame members.

The front steering wheels 50 of the tractor are pivotally mounted in bearings carried by the front sill 4 and are connected as usual by the steering gear connecting-rod 51. The steering hand wheel 56, is connected by means of a gear and pinion with the rod 57 having at its lower end a lever 58, connected by a link-rod 59 with an arm 60 projecting from the hub of one of the steering wheels. The standard 65 which carries the steering handle is carried by a bracket 67, which may be adjusted to different positions along the frame bar 9 in order to bring the steering wheel within convenient reach of the driver for different cars, the link-rod 59 being provided with a telescopic joint 68.

The traction wheels 70 are mounted in bearings carried by the members 10 of the truss side frames. The short axle shafts 75 of the traction wheels are provided on their inner ends with integral forged recessed or cupped attaching plates 76, to which are bolted disk plates 77 carrying clamping members which may comprise pivoted clamping levers 78 adapted to be brought into engagement with the tires by means of wing bolts 79 threaded in the rearwardly projecting arms of the levers and bearing against lugs 80. It is evident that other suitable clamping devices may be employed. The shafts 75 are longitudinally slidable through the traction wheels for the purpose of connecting or disconnecting the wheels of the automobile as will be hereinafter explained, the shaft being slotted to permit the passage of the bolt 97.

A stationary bearing member 82, bolted at 83 to the yoke frame member 10, carries upon its outer periphery an annular bearing member 85 which provides a bearing support for the hub 86 of the traction wheel on the side adjacent the driving wheel of the automobile through which power is transmitted. A sleeve 90 surrounding the shaft furnishes a bearing 90ª for the opposite side of the hub. The central part 90ᵇ of the sleeve forms an eccentric and carries a loosely mounted gear 92, which engages through a portion of its periphery with the internal gear teeth on a gear ring or sleeve 93, adjustable axially within the hub by means of the projecting lugs 94 which are held in adjusted position by set screws 95. Power transmitted to the shaft 75, is transmitted to the sleeve 90 through the bolt 96, pivoted to the sleeve and passing through the slot in the shaft.

As the sleeve is rotated the gear 92 partakes of the orbital movement of the eccentric 90ᵇ, but is held from rotation by means of a pair of lugs 98 projecting from the face of a disk plate 100 which enter grooves 101 in the lateral face of the gear, the plate being held from rotation by a pair of lugs 103 projecting from a flange 82ª on the stationary member 82, and entering grooves formed between lugs 104 on the disk 100. These two sets of lugs are disposed in planes at right angles and constitute the well-known "Oldham" coupling. By providing a larger number of teeth on the gear ring 93, than on the gear 92 and in the proper ratio, the desired reduction in speed between the driving wheels of the automobile and the traction wheels may be obtained. Thus, if the gear 70 is provided with 32 teeth and the gear ring with 34 teeth, there will be a reduction of speed in the ratio of 18 to 1 which will produce the slow speed desired for the field work in the farming operations.

As previously pointed out, it is desirable to operate the tractor at a greater speed when hauling trucks and wagons over roads than is required for farming operations. To provide for a smaller gear ratio and therefore a greater speed of the traction wheels, I spline a small gear 110 to the sleeve which meshes with idler pinions 112 carried upon pins projecting from the stationary member 82ª. By sliding the gear ring 93 from engagement with the gear 92 into mesh with the idlers 112, power will be transmitted from the sleeve through the gear 110 and idlers 112 to the gear ring 93 with a smaller reduction in gear ratio and thereby causing a higher speed of the traction wheels.

When it is desired to transmit power to other machinery, as for instance, to operate feed chopping or grinding machines, threshing machines, silo elevators, etc., the shaft 75 is disconnected from the sleeve 90 by loosening the nut 97 and swinging the bolt 96 down into the position indicated in Figs. 12 and 13. The sleeve 90 will be maintained in position by the nut 115, and the end cap 116. A split belt pulley 120 is then brought into the position indicated and secured to the disk 77 by bolts 121. The pull of the belt which connects the pulley with the machine to be driven produces no lateral binding strains upon the driving axle of the automobile because the outer free end of the shaft 75 is supported in the bearings within the hub of the traction wheel. The several bearing surfaces surrounding the sleeve 90 may be provided with suitable bushings 91 and the bearings may be made dust proof by means of felt rings 99.

The operation of my tractor-car will be evident from the foregoing detailed description of the structural parts. When an automobile is to be connected to the tractor-car, the shafts 75 are slid outwardly until the disk-plates 77 and clamps 78 are outside of the channel bars 2ᵇ so that they will clear the wheels and hubs of the automobile. The slot in the shaft permits this sliding movement without moving the bolt 96. The crank handle 43 is then inserted into the socket in the bevel gear 40, and the jacks operated to incline the runways until their outer ends rest upon the ground. After the automobile has been run into position the jacks are operated to lift the machine until the rear axle is in alinement with the hubs of the traction wheels. Upon sliding the shafts inwardly and clamping the tires, the jacks are manipulated to lower the frame bars 2ᵇ into the position shown in Fig. 3, to clear the clamps and transfer the weight of the machine to the traction wheels. If it is desired to operate farming implements in the field the gearing 93 is placed in engagement with the gear 92, and for hauling upon the road it is shifted over into engagement with the idlers 112, to change the ratio of the reduction gear mechanism in the manner previously explained.

The automobile may be disconnected from the tractor-car readily by raising the rear frame members into engagement with the wheels unclamping the tires, sliding the shafts outwardly and lowering the frame members into inclined position. The entire operation is extremely simple and may be readily accomplished by anyone. There are no sprocket chains to be disconnected and there are no auxiliary skids or other devices to be carried. The automobile requires no auxiliary attachments or alterations and is subjected to no additional strains when furnishing power to the tractor-car or to other machinery.

The tractor carriage may be readily employed for the purposes of a road roller by securing to the forward end of the frame an arched frame member, as shown in Fig. 15, comprising a pair of yoke members 130 arching forwardly and inwardly to a central bearing 131, for the pivot spindle of the usual wide heavy road roller 134. The upper end of the spindle carries a bevel gear 136 meshing with a pinion 137 which connects through a universal connection 138 with the shaft 139 of the steering mechanism.

The importance of maintaining the roads in good condition is now recognized as being of prime importance. My tractor carriage will enable every county to maintain a road equipment at small expense and with a minimum outlay. Moreover, the operation of this road roller requires no special skill which is quite an important consideration.

I have described in detail the particular structural features shown in the accompanying drawings but various changes and equivalent constructions will suggest themselves to engineers. Thus instead of providing a loose gear ring 93, which is shifted into engagement with the gear 92 or the idlers 112, to change from one speed ratio to the other, I may provide two separate gear rings which are constantly in mesh with gear 92, and the idler pinions 112, respectively, in coöperation with a slidable key which locks the one or the other gear ring to the hub 86, or when in neutral position allows the shaft to run free. With this arrangement, it is obvious that it is unnecessary to loosen the bolt 96 from the shaft when it is desired to drive the shaft without driving the traction wheels, as when transmitting power from the belt pulley.

Again instead of forming the casing for the jack screws of two channel bars, it may be constructed as a single cored casting. Such changes are obvious and therefore require no special illustration.

I claim:

1. A tractor carriage for automobiles, comprising a frame provided with supporting wheels and having pivoted frame members adapted to be inclined to form runways for the wheels of an automobile, means for raising and lowering said members, and clamping means coaxial with the rear wheels of the carriage and movable coaxially thereof to engage the tires of the automobile.

2. A tractor carriage for automobiles, comprising a frame provided with supporting wheels and having channeled frame members adapted to form runways for the wheels of an automobile, and clamping means coaxial with the rear wheels of the carriage and movable coaxially thereof to engage the tires of the automobile.

3. A tractor carriage for automobiles, comprising a frame provided with supporting wheels and clamping means coaxial with the rear wheels of the carriage and movable coaxially thereof to engage the tires of the automobile.

4. A tractor carriage for automobiles, comprising a wheel-supported jointed frame having a tiltable runway portion, and means for inclining said runway.

5. A tractor carriage for automobiles, comprising a wheel-supported jointed frame having a tiltable runway portion, and means for inclining said runway, said means coacting with other frame parts to form a truss effective in all positions of inclination of the runway.

6. A tractor carriage for automobiles, comprising a frame front steering wheels and rear traction wheels therefor, tire clamping means movable coaxially of said rear traction wheels, and speed changing mechanism interposed between said traction wheels and said clamping means.

7. A tractor carriage for automobiles, comprising a frame, front steering wheels and rear traction wheels therefor, tire clamping means movable coaxially of said rear traction wheels, and speed changing mechanism arranged coaxially within the hubs of said rear wheels and operatively connected to said clamping means.

8. A tractor carriage for automobiles, comprising a frame, front steering wheels and rear traction wheels therefor, a shaft mounted in bearings within the hub of each traction wheel and axially slidable therein, tire clamping means carried by said shaft, speed changing mechanism within said hub and connected thereto, and means for connecting or disconnecting said mechanism to said shaft.

9. A tractor carriage for automobiles, comprising a frame, front steering wheels and rear traction wheels therefor, a shaft mounted in bearings within the hub of each traction wheel and axially slidable therein, tire clamping means carried by said shaft, speed changing mechanism within said hub and connected thereto, means for connecting or disconnecting said mechanism to said shaft, and power transmitting means connected to said shaft.

10. A tractor carriage for automobiles, comprising a frame, front steering wheels and rear traction wheels therefor, tire clamping means for engaging the tires of the driving wheels of an automobile mounted thereon and movable coaxially in relation to said automobile tires.

In testimony whereof I affix my signature.

NATHANIEL B. WALES.